April 7, 1925.  
J. D. ANDREW  
ENGAGING AND DISENGAGING GEAR FOR SHIPS' BOATS  
Filed Oct. 9, 1922  
1,532,857  
2 Sheets-Sheet 1
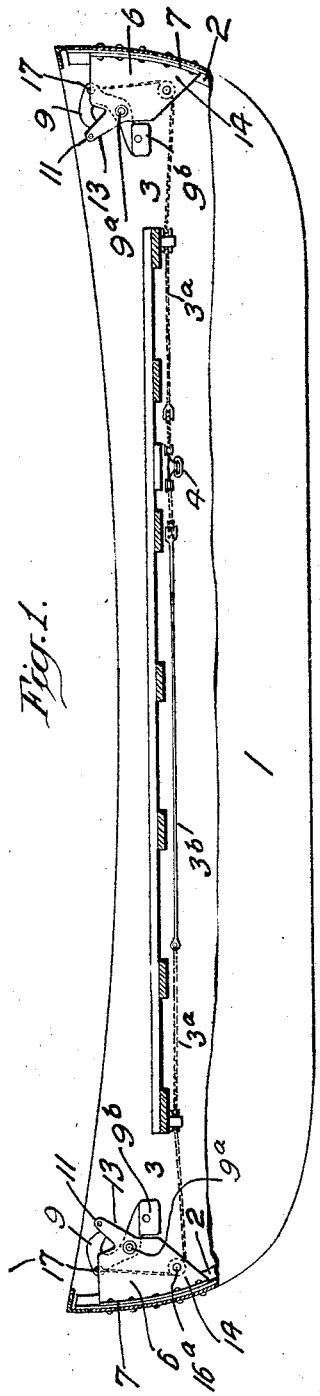
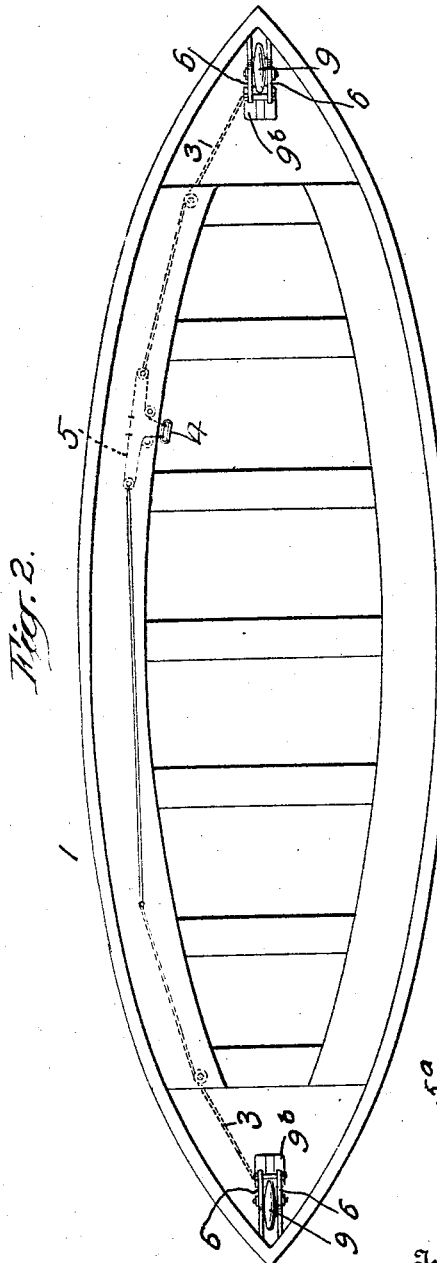
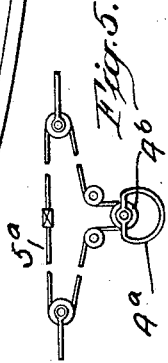
Inventor  
James D. Andrew  
By his Attorney  
Joseph F. O'Brien April 7, 1925.

J. D. ANDREW 1,532,857

ENGAGING AND DISENGAGING GEAR FOR SHIPS' BOATS

Filed Oct. 9, 1922

Inventor
James D. Andrew
By his Attorney
Joseph F. O'Brien

Patented Apr. 7, 1925.

1,532,857

UNITED STATES PATENT OFFICE.

JAMES D. ANDREW, OF ENGLEWOOD, NEW JERSEY, ASSIGNOR, BY MESNE ASSIGNMENTS TO WELIN DAVIT & BOAT CORPORATION, A CORPORATION OF NEW YORK.

ENGAGING AND DISENGAGING GEAR FOR SHIPS' BOATS.

Application filed October 9, 1922. Serial No. 593,405.

*To all whom it may concern:*

Be it known that I, JAMES D. ANDREW, a citizen of the United States, and a resident of Englewood, county of Bergen, and State of New Jersey, have invented certain new and useful Improvements in Engaging and Disengaging Gears for Ships' Boats, of which the following is a specification.

This invention relates to improvements in engaging and disengaging gear for ships' boats, and is particularly an improvement upon the type of gear illustrated in Letters Patent to H. W. Broady, #1,168,377, dated January 18th, 1916.

Among the objects of my invention are, the production of a gear from a minimum number of parts; the simplification of structure and more positive operation of the gear parts; the reduction of the size of the gear; the saving in space occupied thereby and the reduction of the cost of manufacture of the said gear; the provision in such a gear of hook-mounting brackets having integrally-formed ring-guiding members preferably composed of opposite halves of integral ring-guiding projections on the braket plates; the provision in such a hook-mounting bracket of integrally-formed limiting stops, first, for retaining the hook in proper engaging position, and second, for limiting the disengaging movement so that the operator may, when the pull-chain is pulled to swing the hook to full-open position, hear the "click" of the hook against the bracket and may also, because of such opening limit, determine and know definitely when the hook is in full-open position; the arrangement of gear parts to enable the attachment of a flexible actuating-connection or pull chain at the rear of the hook and the guiding thereof between spaced bracket plates; the mounting between the bracket plates of a guiding sheave for the said actuating connection or pull chain; the elimination from the gear of cast metal parts and the manufacture from drop forgings and wrought metal of all parts that are subjected to strain or wear in operation; the manufacture of the hook and counter-weight in two connected parts so as to permit a cast metal counter-weight to be employed in combination with a drop forged hook; and the provision of a pull-chain having a power-multiplying connection within the boat which is adapted to cooperate with means for guiding and attaching said connection at the rear of the hook above the pivot thereof; and means for limiting the opening and closing movements of the hook, preferably by engagement of the counter-weight against the mounting bracket at its opposite limits of movement.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a view, partly in vertical section and partly in elevation, illustrating a metallic boat equipped with improved gear made in accordance with my invention;

Fig. 2 is a plan view of the boat and gear illustrated in Fig. 1;

Fig. 5 is a modification of the power multiplying device.

Figure 4:
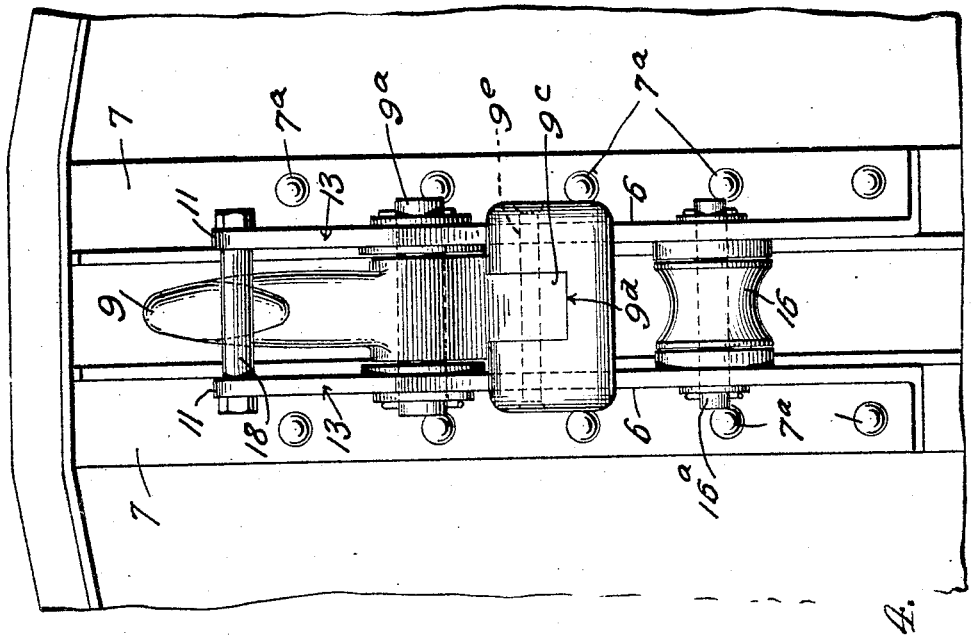
Fig. 4 is an enlarged front elevation of the device shown in Figs. 1 to 3.

Refering now to these drawings, which illustrate a preferred embodiment of my invention, 1 indicates a boat and 2 the keel thereof, on which keel at opposite ends of the boat are mounted in supporting brackets tripping hooks embodied in my improved engaging and disengaging gear, the said oppositely arranged tripping hooks being connected by flexible connections 3 comprising pull chains $3^a$ and rods $3^b$ to a common releasing-handle 4. It is desirable to provide a tripping hook which will be as compact as possible and also to have the guiding pulleys for the operating connections as close to the hook as possible, and by my invention I have eliminated the usual long counter-weighted portions below the hook pivot and have connected one end of the pull chains to the hook above the pivot at the rear edge thereof. This close positioning of the guiding pulley and attachment of the pull chain or operating connection provides only a relatively short leverage from the hook pivot and in order that such leverage may be sufficient to enable the facile operation of hooks at opposite ends of the boat by one man, I preferably provide between the releasing handle 4 and each of the pull chains 3 a power multiplying connection 5. Such connection of the pull chains to the hook above and close to the pivot thereof enables the guiding of such pull chains by means of a sheave mounted in the bracket below the pivot of the hook. By making a connection of the pull chains with the hook and the employment of such a power multiplying device between the pull chains at opposite ends and the attachment thereof to the hook, I am enabled to shorten the hook at the opposite side of the pivot and at the same time procure a lever which with the power-multiplying device will enable a more ready and more facile operation of the opposite hooks by one man than has heretofore been possible without the use of outside levers and a construction which is operated to open by a downward pull with the assistance of gravity instead of by an upward pull as in the said Broady patent.

For the purposes above specified and also for the purpose of manufacturing each of the gears from a minimum number of parts, simplifying and reducing the size of the hooks and associated parts so as to occupy a minimum amount of space, and for the purpose of reducing the cost of manufacturing said gear, I preferably provide for each hook a supporting or mounting bracket having provision within the bracket of integral hook bearings, integral sheave bearings, integral ring-guiding members and integral stops for limiting the movement of the hook in opposite directions. The preferred form of bracket is of substantially the shape shown in Figs. 1 and 3 and comprises, as shown, two bracket plates 6 having integral attaching flanges 7 at one side edge for connection to the keel of the boat by means of rivets 7$^a$ or like fastening devices; also having adjacent to the opposite edge a pivot bearing 8 for a hook pivot 9$^a$ on which the hook 9 is mounted; also having integral inclined projections 11 forming at the outer top corner of said bracket plates a ring guiding member or fork, and also preferably having an outer side edge portion 13 shaped to form a limiting stop for the hook in engaging position and a portion shaped to form a limiting stop for engagement of the hook in its swinging movement to full open position. Said bracket also preferably has a depending bottom portion 14 provided with bearings 15 for the pintle 16$^a$ of a guiding sheave 16, which is positioned at the rear of the pivot 9$^a$ and around which the pull chain 3 passes to permit the connection of the end thereof to an eye 17 formed at the upper rear end of the hook and above the pivot 9$^a$ of said hook. The said bracket plates are at their rear edges preferably securely connected, as aforesaid, to the boat and the front edges are spaced and connected at different portions by the hook and its pivot and by a bolt 18 and also by the sheave 16 and its pivot 16$^a$ so that the front edges of the pair of brackets are securely and solidly retained in spaced relationship from each other. These bracket plates may be formed of any suitable plate material such as wrought metal.

I preferably make the hook in two parts, so as to enable the body part 9 to be made of a drop forging, while the counter-weight 9$^b$ may be formed of cast metal. As illustrated, the portion of the hook 9 below its pivotal point is relatively short and has a tongue 9$^c$ and a counter-weight 9$^b$ is provided with a corresponding groove 9$^d$ into which the tongue is fitted and the parts are then connected together with a pin or rivet 9$^e$. The counter-weight is preferably made short and wide so as to further reduce the space occupied by the gear and as shown is of rectangular conformation and the movements of the hook to engaging position and disengaging position respectively are preferably limited by the engagement of adjacent edges of the counter-weight against the edges 12 and 13 respectively of the bracket plates 6.

Figure 3:
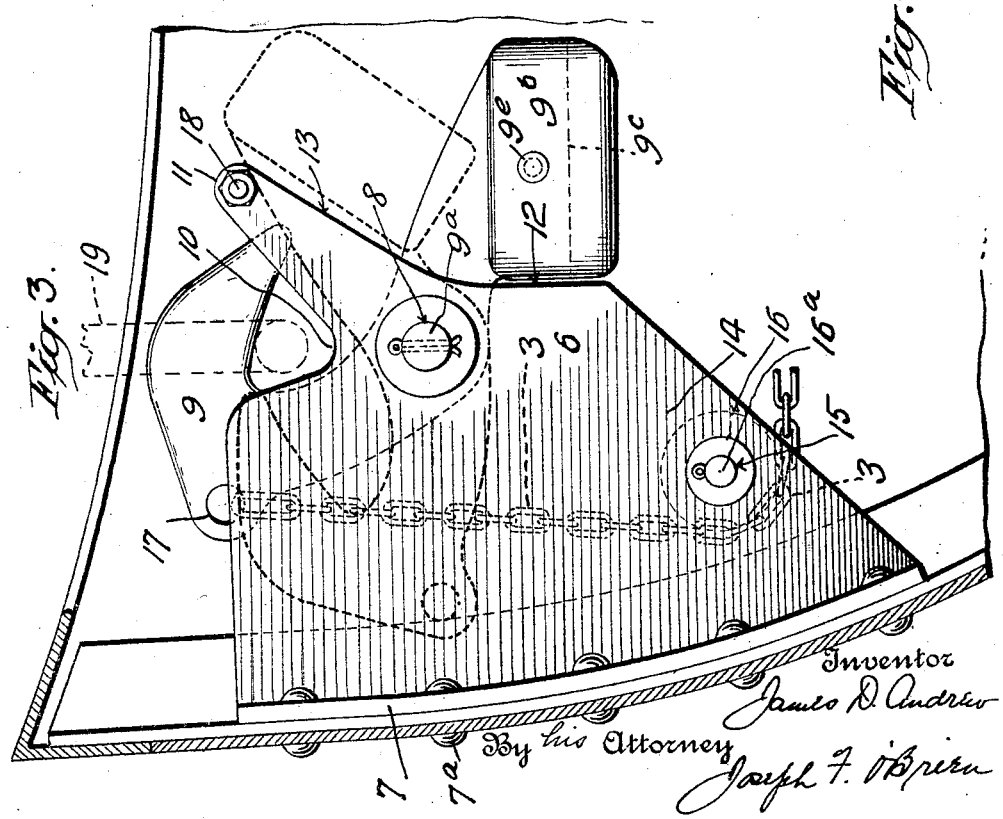
Fig. 3 is an enlarged side elevation of one of the mounted hooks embodied in my improved gear shown in Figs. 1 and 2.

In operation, the normal position of the hook being as shown in Fig. 3 with the rear edge of the counter-weight resting against the edges 12 of the bracket plates, the ring 19 of the falls may, if desired, by a simple pressing of the ring along the projection 11 be forced into the groove 10 beneath the hook 9 or the counter-weight 9$^b$ may be lifted to permit the insertion of the ring therein. When it is desired to release said ring from the hook, a pull on the handle 4 will cause the hooks at opposite ends of the boat to be swung simultaneously on the pivots into disengaging position shown in dotted lines in Fig. 3, in which position the top surface of the counter-weight of each hook will engage the edges 13 of the bracket plate 3. When the hook is so operated to its respective positions the operator will be enabled to hear the "click" of the hook when it strikes its extreme positions, and particularly when it strikes the limit of its full open position the operator will, because of positive blocking of further movement, be enabled to feel and know definitely that the hook has reached such full open position. The attachment of the pull-chain to the hook above and to the rear of the pivot 9$^a$ enables the positioning of the sheave in the bracket, the shortening of the leverage below the counter-weight and the reduction of the size of the gear and space occupied thereby.

In Fig. 5 we have shown a power-multiplying device 5$^a$ which is similar to the power-multiplying device described and shown in Figs. 1 and 2 except that a sheave 4ᵇ is mounted in the handle and the flexible connection, instead of being attached to the handle, passes over said sheave. This form of device enables any inequalities in the opposite legs or stretches of the flexible connection comprising the power-multiplying device to be compensated for, and when such a device is used with a hook having its opening and closing movements limited as hereinabove specified enables the operator to pull the hooks at opposite ends of the boat simultaneously to their full limits of opening movements, notwithstanding any inequalities or stretching of the parts.

While it is desirable in gears of this character to provide means whereby the opposite hooks may be disengaged with facility by one man, it is necessary for reasons of safety to provide hooks which cannot be disengaged under load, and I have by the combination of elements shown, to wit, the connection of the pull chains with the hook so as to have relatively short but sufficient leverage above the pivot in combination with the power-multiplying device hereinabove specified, produced a gear which though both hooks may be simultaneously released with great facility by one man when unloaded, or when the boat is waterborne, such hooks cannot be released when the hooks are loaded or suspended from the davits.

Having described my invention, I claim:—

1. In engaging and disengaging gears for ships' boats, the combination with a pivoted tripping hook, of a hook-mounting bracket comprising two spaced and laterally-extending plates between which said hook is pivoted, each of said plates having integrally formed bearing and attaching ring-guiding portions, and means for actuating said hook to swing about its pivot to engaging and disengaging positions respectively.

2. In engaging and disengaging gears for ships' boats, the combination with a pivoted, counter-weighted tripping hook, of a hook-mounting bracket comprising two spaced and laterally-extending plates having attaching portions and pivot-bearings for said hook, each of said plates also having integrally-formed projecting portions above the pivot-bearings forming one half of a guide for the ring of the falls, a bolt for connecting said projecting portions at their outer ends and flexible connections within the boat for swinging said hook to disengaging position.

3. In engaging and disengaging gears for ships' boats, the combination with a pair of positively pivoted and counterweighted tripping hooks arranged at opposite ends of the boat, an abutment engaging the counterweight for limiting the opening movement of said hooks, two flexible connections mounted within the boat, one end of each connection being connected to one of said hooks, the other ends being provided with pulleys and a power-multiplying device associated with said flexible connections and comprising an independent flexible connection passing over each of said pulleys and having return parts extending toward each other, and a common pulling handle provided with a sheave mounted upon said power-multiplying connection.

4. In engaging and disengaging gears for ships' boats, the combination with a pair of positively pivoted and counterweighted tripping hooks, of a hook-mounting bracket for pivotally supporting one of said hooks at each end of the boat, an abutment engaging the counterweight for limiting the opening movement of the hook, a flexible connection mounted within the boat for actuating each of said hooks, one end of which is connected to said hook above its pivotal point at the rear edge of the hook, and the other end of which is provided with a pulley, and power multiplying device associated with said actuating flexible connections and comprising an independent flexible connection passing over each of said pulleys, said power-multiplying connection having a portion at one side of said pulleys fixed to the boat and portions extending parallel thereto, and a common pulling handle attached to the said parallel portions as and for the purpose specified.

5. In engaging and disengaging gears for ships' boats, the combination with a pair of positively pivoted tripping hooks each having a relatively short counter-weighted portion below its pivot, of a hook-mounting bracket for pivotally supporting one of said hooks at each end of the boat, an abutment engaging the counter-weight for limiting the opening movement of the hook, a sheave mounted in said bracket below said hook pivot, a flexible connection mounted within the boat for actuating each of said hooks, one end of which is connected to said hook above its pivotal point at the rear edge of the hook and passes downwardly around said sheave, and the other end of which is provided with a pulley, and power multiplying device associated with said actuating flexible connections and comprising an independent flexible connection passing over each of said pulleys, said power multiplying connections having ends at one side of said pulleys fixed to the boat and return parts extending toward each other, and a common pulling handle provided with a sheave and mounted on said return parts.

6. In engaging and disengaging gears for ships' boats, the combination with a pivoted triping hook having a relatively short counter-weighted portion below its pivot, and a bracket for supporting the same within the boat comprising two spaced plates, said plates having between their edges pivot bearings for the hook, and also having integrally-formed abutments for the counterweight which serve as stops to limit the movement of the hook to engaging and disengaging positions respectively.

7. In engaging said disengaging gears for ships' boats, the combination with a pair of pivoted tripping hooks, each having a relatively short counter-weighted portion below its pivot and a bracket for supporting one of said hooks at each end of the boat comprising two spaced plates, said plates having pivot bearings for the hook and also having integrally-formed abutment portions for the counter-weight, integrally-formed ring-guiding portions and sheave-mounting portions below the pivot provided with bearings for a sheave; a guiding-sheave mounted within such bearings and an actuating flexible connection for each hook mounted within the boat and having an end passing over each sheave and attached to the hook above the hook pivot at the rear edge thereof, and means for actuating said connections simultaneously at opposite ends of the boat.

In witness whereof, I have signed my name to the foregoing specification in the presence of two subscribing witnesses.

JAMES D. ANDREW.

Witnesses:
  HELEN V. WHIDDLER,
  JULIUS M. LUTZ.